US008887172B2

(12) United States Patent
Bernardi et al.

(10) Patent No.: US 8,887,172 B2
(45) Date of Patent: Nov. 11, 2014

(54) VIRTUALIZED MANAGEMENT OF REMOTE PRESENTATION SESSIONS USING VIRTUAL MACHINES HAVING LOAD ABOVE OR BELOW THRESHOLDS

(75) Inventors: Ara Bernardi, Mercer Island, WA (US); Nelamangal Krishnaswamy Srinivas, Sammamish, WA (US); Manoj Patra, Gachibowli (IN); Arvind Kandhare, Gachibowli (IN); Shivesh Ranjan, Gachibowli (IN)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 12/651,260

(22) Filed: Dec. 31, 2009

(65) Prior Publication Data
US 2011/0161957 A1 Jun. 30, 2011

(51) Int. Cl.
G06F 9/46 (2006.01)
G06F 9/455 (2006.01)
G06F 1/00 (2006.01)
G06F 15/16 (2006.01)
H04L 29/08 (2006.01)
G06F 9/50 (2006.01)
G06F 9/44 (2006.01)

(52) U.S. Cl.
CPC ............ G06F 9/505 (2013.01); H04L 67/2809 (2013.01); G06F 9/5083 (2013.01); G06F 9/4445 (2013.01); G06F 9/5077 (2013.01); G06F 2009/4557 (2013.01)
USPC ............... 718/105; 718/1; 718/100; 713/310; 709/227

(58) Field of Classification Search
None
See application file for complete search history.

(56) References Cited

U.S. PATENT DOCUMENTS

| | | | |
|---|---|---|---|
| 7,437,730 B2 * | 10/2008 | Goyal | 718/105 |
| 7,490,330 B2 * | 2/2009 | Sexton et al. | 719/312 |
| 7,581,006 B1 | 8/2009 | Lara et al. | |
| 8,010,679 B2 * | 8/2011 | Low et al. | 709/227 |
| 8,141,075 B1 * | 3/2012 | Chawla et al. | 718/1 |
| 8,176,486 B2 * | 5/2012 | Amir Husain | 718/1 |
| 8,185,893 B2 * | 5/2012 | Hyser et al. | 718/1 |
| 2005/0060590 A1 * | 3/2005 | Bradley et al. | 713/320 |
| 2007/0179955 A1 | 8/2007 | Croft et al. | |
| 2007/0271560 A1 * | 11/2007 | Wahlert et al. | 718/1 |
| 2008/0066073 A1 | 3/2008 | Sen | |
| 2008/0222638 A1 * | 9/2008 | Beaty et al. | 718/100 |
| 2009/0106571 A1 * | 4/2009 | Low et al. | 713/310 |
| 2009/0216975 A1 | 8/2009 | Halperin et al. | |
| 2011/0055830 A1 * | 3/2011 | Kamay et al. | 718/1 |

OTHER PUBLICATIONS

Bradley, Duane; Citrix Presentation Server Load Management, MTM Technologies, Jan. 3, 2007.*

(Continued)

Primary Examiner — Meng An
Assistant Examiner — Bing Zhao
(74) Attorney, Agent, or Firm — Jim Sfekas; Kate Drakos; Micky Minhas

(57) ABSTRACT

Systems, methods, and computer-readable storage media are disclosed for virtualized eco-friendly remote presentation session roles. In an embodiment, a connection broker monitors the servers of a server farm, and, based upon characteristics of remote presentation sessions served by VMs executing on those servers, directs VMs on those servers to be migrated between servers, changed from sleeping to running or vice versa, or other operations that may improve the performance of the server farm as a whole.

20 Claims, 11 Drawing Sheets

(56) References Cited

OTHER PUBLICATIONS

Microsoft Corporation, "Technical Overview of Windows Server® 2008 R2 Remote Desktop Services," May, 2009, 37 pages, downloaded at www.smartbusiness.ie/Documents/TDM-RDS-Whitepaper_RC.aspx.

VMware Cisco EMC, "Enterprise Virtual Desktop Infrastructure: Design for Performance and Reliability," 2009, 15 pages, downloaded at www.cisco.com/en/US/solutions/collateral/ns340/ns517/ns224/ns377/white_paper_c11-541004_R2_v7.pdf.

NetWorld UK, "Experience Complete Control Over Your Distributed IT and Mobile Networks," 2009, 1 page, downloaded at www.prismdeploy.co.uk/prism_suite_software.asp.

* cited by examiner

VIRTUALIZED MANAGEMENT OF REMOTE PRESENTATION SESSIONS USING VIRTUAL MACHINES HAVING LOAD ABOVE OR BELOW THRESHOLDS

BACKGROUND OF THE INVENTION

Although computers were once isolated and had minimal or little interaction with other computers, computers now interact with a wide variety of other computers through Local Area Networks (LANs), Wide Area Networks (WANs), dial-up connections, and the like. With the wide-spread growth of the Internet, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation systems, which can use protocols such as Remote Desktop Protocol (RDP), Independent Computing Architecture (ICA), and others to share a desktop and other applications with a remote client. Such computing systems typically transmit the keyboard presses and mouse clicks or selections from a client computing device to a server computing device, relaying the screen updates back in the other direction over a communications network (e.g., the INTERNET™). As such, the user has the experience as if their machine is operating as part of a LAN, when in reality the client is only sent screenshots, or frames, of the applications as they appear on the server side.

Where many remote presentation sessions are to be served, a server farm configuration may be used. In a server farm, a plurality of remote presentation session servers may host remote presentation sessions. Each server may host one or more virtual machines (VMs), each VM configured to engage in a remote presentation session with a client. Such servers are frequently referred to as "hosts" when hosting one or more VMs.

There are problems with a server farm. Servers may need to be periodically taken offline for maintenance activities (like applying patches), and this disrupts any remote presentation sessions active on the server. Further, electricity consumption (frequently a significant issue for server farms) may be difficult to minimize. Where a single server has the processing resources to execute each remote presentation session, but the remote presentation sessions are active across each of the servers of the server farm, each of those servers is active and consuming power, instead of a single server being active and consuming power.

There do exist techniques for balancing loads—the amount of work that an individual computer must perform (given that, when a process is referred to as having a load, it may be thought of as the process's contribution to the load of the computer upon which it executes)—across the servers of a server farm. However, these techniques do not account for remote presentation sessions that may be executing on the server, so are sub-optimal in the remote presentation session case. For instance, a VM hosting a remote presentation session may have only disconnected remote presentation sessions (a disconnected session may be distinguished from a logged off session in that a disconnected session may still have activity associated with it, such as a batch process being executed, even though an active remote presentation session is not occurring with a client; further where the client locks the remote presentation session similar to locking a desktop computer, the session is set to disconnected rather than logged off), and could be put to sleep, and present techniques would not identify this, and not be able to achieve the load balancing or electricity savings that would go with such identification and corresponding processing.

SUMMARY OF THE INVENTION

It would, therefore, be an improvement to provide techniques for load balancing among a plurality of servers that host VMs in which remote presentation sessions are executed. These techniques involve both optimizing the distribution of incoming remote presentation session connections across both servers and VMs, and minimizing the number of servers used based on present remote presentation sessions. Whereas many load balancing techniques attempt only to spread the load as evenly as possible across servers, the present techniques also reduce electricity consumption by minimizing the number of servers in use, and minimizing the electricity consumption of those in use (and sleeping the rest).

In an embodiment, a connection broker monitors the servers of a server farm, and, based upon characteristics of remote presentation sessions served by VMs executing on those servers, directs VMs on those servers to be migrated between servers, changed from sleeping to running or vice versa, or other operations that may improve the performance of the server farm as a whole.

In an embodiment, the connection broker monitors the servers of a server farm, and assigns incoming remote presentation session connections to the VMs of the servers based upon characteristics of remote presentation sessions served by the VMs.

This disclosure encompasses systems, methods and computer-readable storage media for implementing these teachings.

The primary embodiments described herein discuss computer-executable instructions executed by one or more processors of a computing device. However, it may be appreciated that these techniques may be implemented entirely in terms of hardware, such as through appropriately programming field-programmable gate arrays (FPGAs), or some combination thereof. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for a virtualized eco-friendly remote presentation session role are further described with reference to the accompanying drawings in which.

DETAILED DESCRIPTION OF ILLUSTRATIVE EMBODIMENTS

Figure 1:
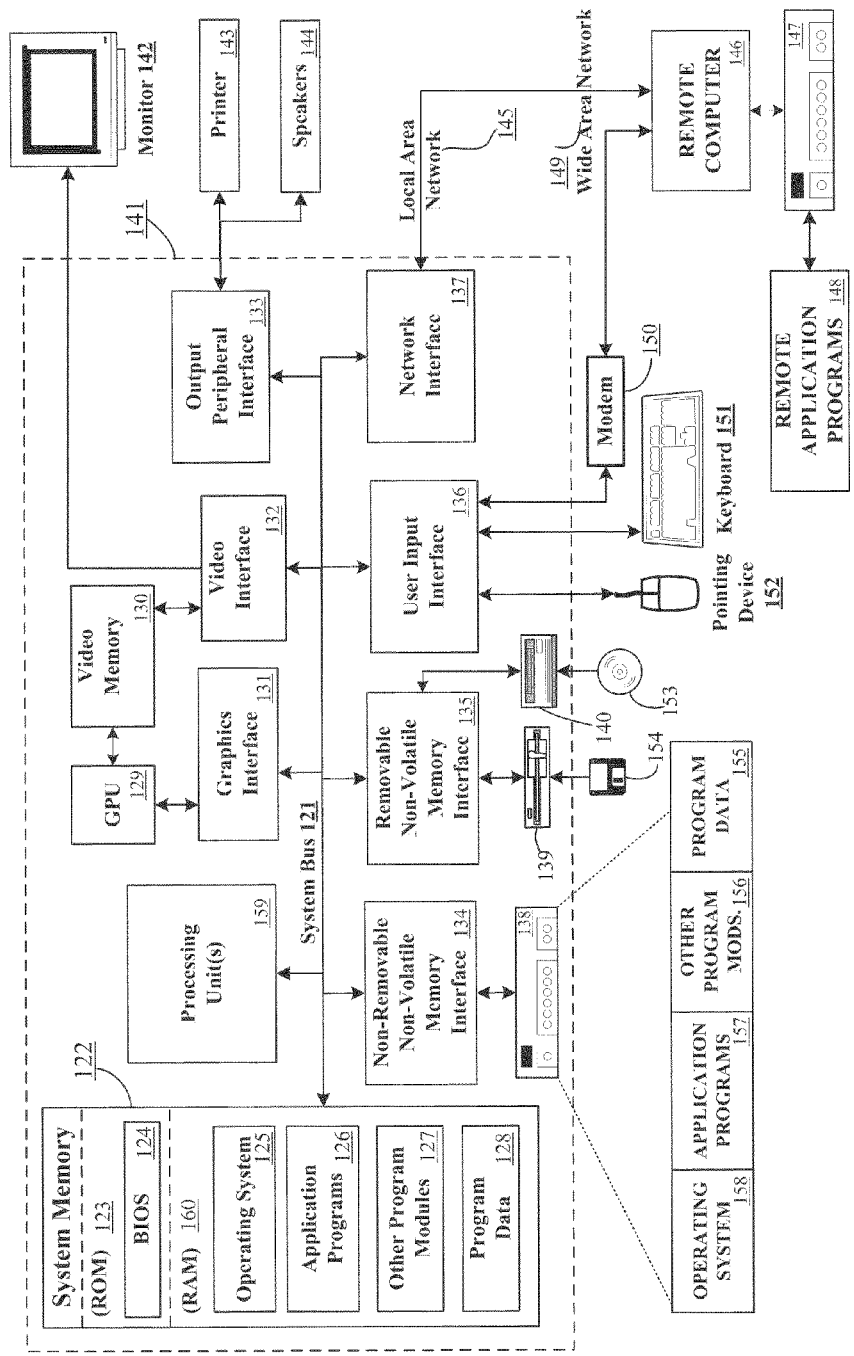
FIG. 1 illustrates an example general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the example operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 122 includes computer-readable storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer-readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN)

145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are example and other means of establishing a communications link between the computers may be used.

Figure 2:
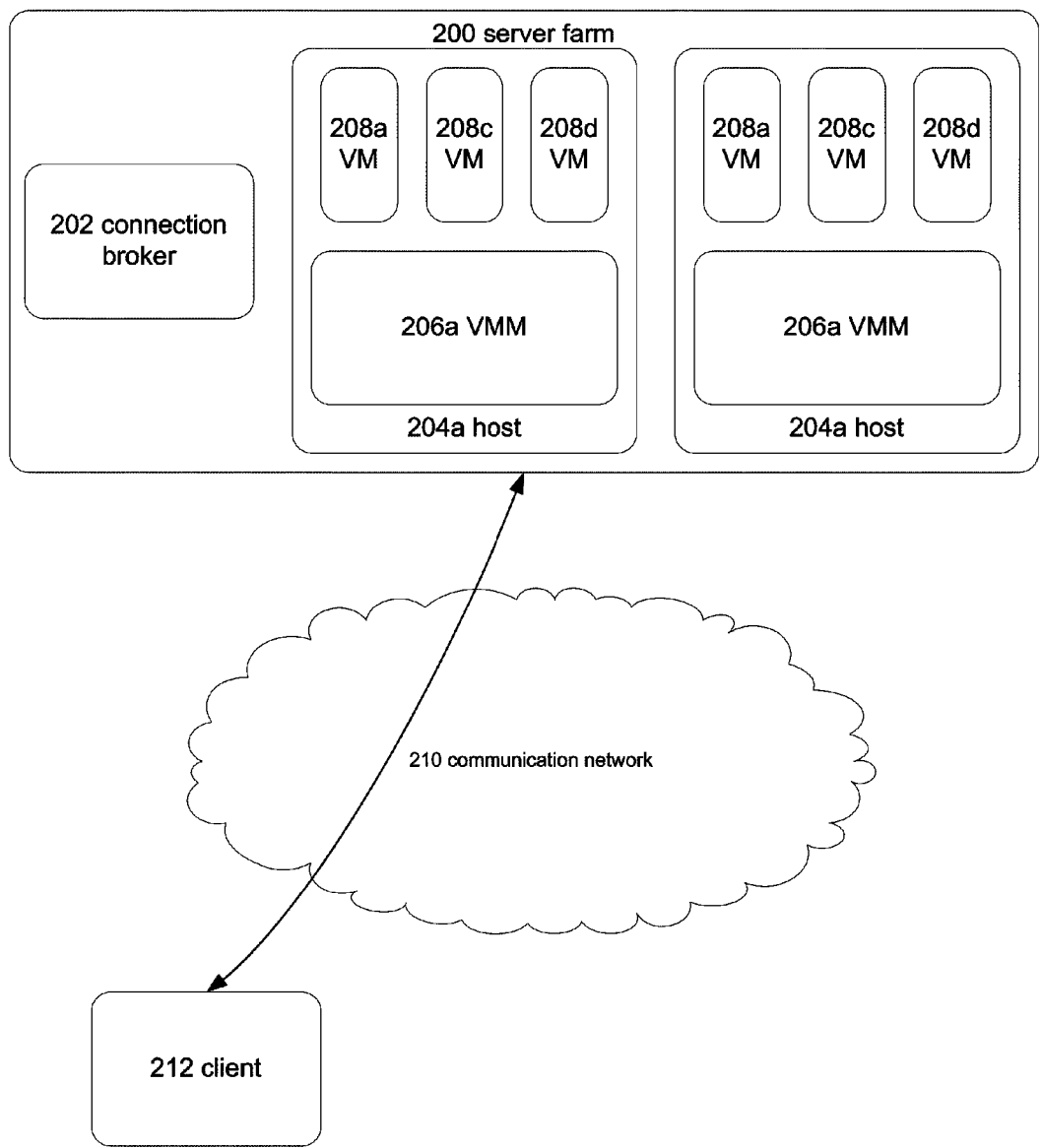
FIG. 2 illustrates an example server farm that serves remote presentation sessions.

FIG. 2 illustrates an example server farm that serves remote presentation sessions.

Server farm 200 comprises connection broker 202, as well as a plurality of hosts/servers 204, each host 204 executing a VM monitor 206 ("VMM"), which is configured to manage one or more VMs 208 that execute on host 204. In an embodiment, connection broker 202, host 204, and client 212 comprise computer 141 of FIG. 1.

Connection broker 202 is communicatively coupled to each host 204.

VM 208 is configured to act as a server in a remote presentation session with client 212, or a plurality of clients. Client 212 initiates a remote presentation session by sending a connection request across communications network 210 (such as the INTERNET®) to server farm 200. The incoming connection request is received by connection broker 202. Connection broker uses the techniques discussed in greater detail below with regard to FIGS. 3-7 to determine to which VM the connection will be assigned. Once assigned to a VM 208, client 212 and that VM perform a handshake to establish the connection, and the remote presentation session proceeds between client 212 and that VM across communications network 210. The remote presentation session may occur between client 212 and that VM without transmitting data through connection broker 202.

Connection broker 202 is also configured to communicate with host 204s to balance the load among host 204s by migrating (such as through live migration, where a VM is suspended, moved to a new host, then has its execution resumed) VMs from one host to another. Connection broker 202 may determine that VM 208c is to be migrated from host 204a to host 204b, such as if host 204a lacks the processing resources to execute all its VMs, and host 204b has adequate available processing resources to execute VM 208c. Such techniques are described in greater detail with regard to FIGS. 8-11.

Load Balancing

In reading the detailed description below both with regard to a connection sequence and a periodic analysis of hosts, the following should be kept in mind.

A colloquialism is frequently used below for the sake of readability—"a VM is running that is below PT/above GT/etc." What is meant by this turn of phrase is that the load of the VM (the load of the host executing the VM that is a result of executing the VM) is below PT/above GT/etc.

In some of the below description, the clearest form of explanation is through the use of mathematical equations. For instance, "Load($HR_k$)>PT" may be read as "the load of the host $HR_k$ exceeds PT."

It may be appreciated by one skilled in the art that not every decision branch of every process flow must be implemented in a particular embodiment for that process flow to be useful in managing the load of a server farm.

In the below detailed description, multiple references are made to connection broker determining a characteristic of a VM or a host, such as whether a VM is in the running state. There are multiple techniques for making these determinations. Since communication between a VM and a host occurs through a VMM, that VMM may monitor the load of a VM. Further, the VMM may determine the load of the host upon which it executes, such as by utilizing commands similar to the UNIX® mpstat and iostat commands.

Further, since all remote presentation session communications by a VM are passed through that VM's VMM, the VMM may monitor the state of those connections—such as number of connections, and status of connections (connected or disconnected).

In another embodiment, rather than the VMM actively monitoring the state of those connections, it may query the VM for its load and/or remote presentation session state. Likewise, connection broker may query a host itself for the host's load rather than querying the host's VMM for the host's load.

Additionally, in the below detailed description, multiple references are made to the state of a VM or host. A state may include draining, running, sleeping, shut down, patching drain mode, and saturated, but is not limited to those.

A running VM is one that has sufficient load to accept a remote presentation session connection. A saturated VM is one that does not have sufficient load to accept a remote presentation session connection. A VM in drain state is one that will not accept a remote presentation session connection regardless of its load (as it is intended to rid the VM of all connections so that it can be put to sleep). A VM in drain sleep state is one that will drain until it has no more connections than sleep. A VM in sleep state is one that is sleeping.

A running host is one that has sufficient load to execute a VM that is migrated to it. A saturated host is one that does not have sufficient load to accept a VM being migrated to it. A host in drain state is one that will not accept a VM migrated to it regardless of its load (as it is intended to rid the host of all VMs so that it can be put to sleep). A host in drain sleep state is one that will drain until it has no more VMs than sleep. A host in sleep state is one that is sleeping. A host in drain patch mode is one that will drain until it has no more VMs, at which point a patch to executable code on the system—such as an operating system—or a change to the host's hardware configuration may occur.

Connection broker may maintain a database for VMs and for hosts, storing an association between a VM or host and its state. When connection broker determines the present state of a VM or host, it may look up the state in the database, using the identity of the VM or host as the query.

States are not necessarily exclusive in what they represent. For instance, a VM with saturated state is still running, in that it is not sleeping. However, this saturated VM is not considered to be in the running state because a VM in running state may accept a new remote presentation session connection, whereas a VM in saturated state may not accept a new remote presentation session connection.

Hosts and VMs may need to be free of executing VMs and remote presentation sessions, respectively, so that maintenance, such as patching, may be performed on them. The present techniques may assist this by scheduling a time driven bias in execution of the process flows to systematically free hosts or VMs for updates as a predetermined maintenance time is approached. For instance, each VM may be scheduled for maintenance once per week (on a staggered schedule so that not every VM is ready for maintenance simultaneously). Once per week, regardless of current state, each VM may be set to a drain patch state for the purpose of having no remote presentation sessions on the VM so that maintenance may be performed on it.

(A) Connection Sequence

FIGS. 3-7 illustrate example process flows for dealing with remote presentation session connections—allocating incoming remote presentation session connections among the VMs of a server farm, and managing VMs when a connection terminates (logs off or disconnects).

One objective of the following techniques is to minimize the number of VMs required by the server farm based on current load requirements by increasing the load on current VMs when possible. Another objective is to take down less-loaded VMs and distribute their load onto higher loaded VMs. In this sense, these techniques differ from traditional load balancing and may be considered "green" load balancing, in that they reduce resource consumption.

These techniques may be initiated by client activity relating to connecting to, disconnecting from, or logging off of a remote presentation session.

As used in discussing VMs, "performance threshold" ("PT") is a level of computer resource usage by a VM above which it may be determined that new remote presentation sessions should not be added to the VM (unless the only alternative is to wake a sleeping VM). "Green threshold" ("GT") is a level of computer resource usage by a VM below which it may be determined that the VM should be set to the "drain and sleep" state. PT>GT. Note, that, as discussed below, a host may also be thought of as having a PT and GT. The distinction between whether a host or a VM is being discussed at a particular time in this specification should be taken note of These thresholds may be configured along a resource utilization minimization v. performance maximization continuum. For instance, PT and GT may be set at a higher level to increase the performance of the server farm, or at a lower level to minimize resource utilization.

These thresholds as used may vary as among VMs. For instance, one VM may execute remote presentation sessions according to version 2.0 of a remote presentation session protocol, and a second VM may do the same according to version 1.1 of that protocol. It may be that, due to the particularities of each protocol, PT for the first VM is set at 90% of its maximum load (or some absolute load value, rather than a percentage) and PT for the second VM is set at 85% of its maximum load—a different value than PT of the first VM.

Likewise, hosts upon which VMs execute are thought of as having thresholds. As used in discussing hosts, "performance threshold" ("PT") is a level of computer resource usage by a host above which it may be determined that no VMs may be created on or migrated to the host. "Green threshold" ("GT") is a level of computer resource usage by a host below which it may be determined that a host is under-loaded and an attempt should be made to migrate VMs away from the host and make the host hibernate. "Migration threshold" ("MT") is a level of computer resource usage by a host above which it may be determined that a host is overloaded and VMs should be migrated from the host. MT>PT>GT.

Figure 3:
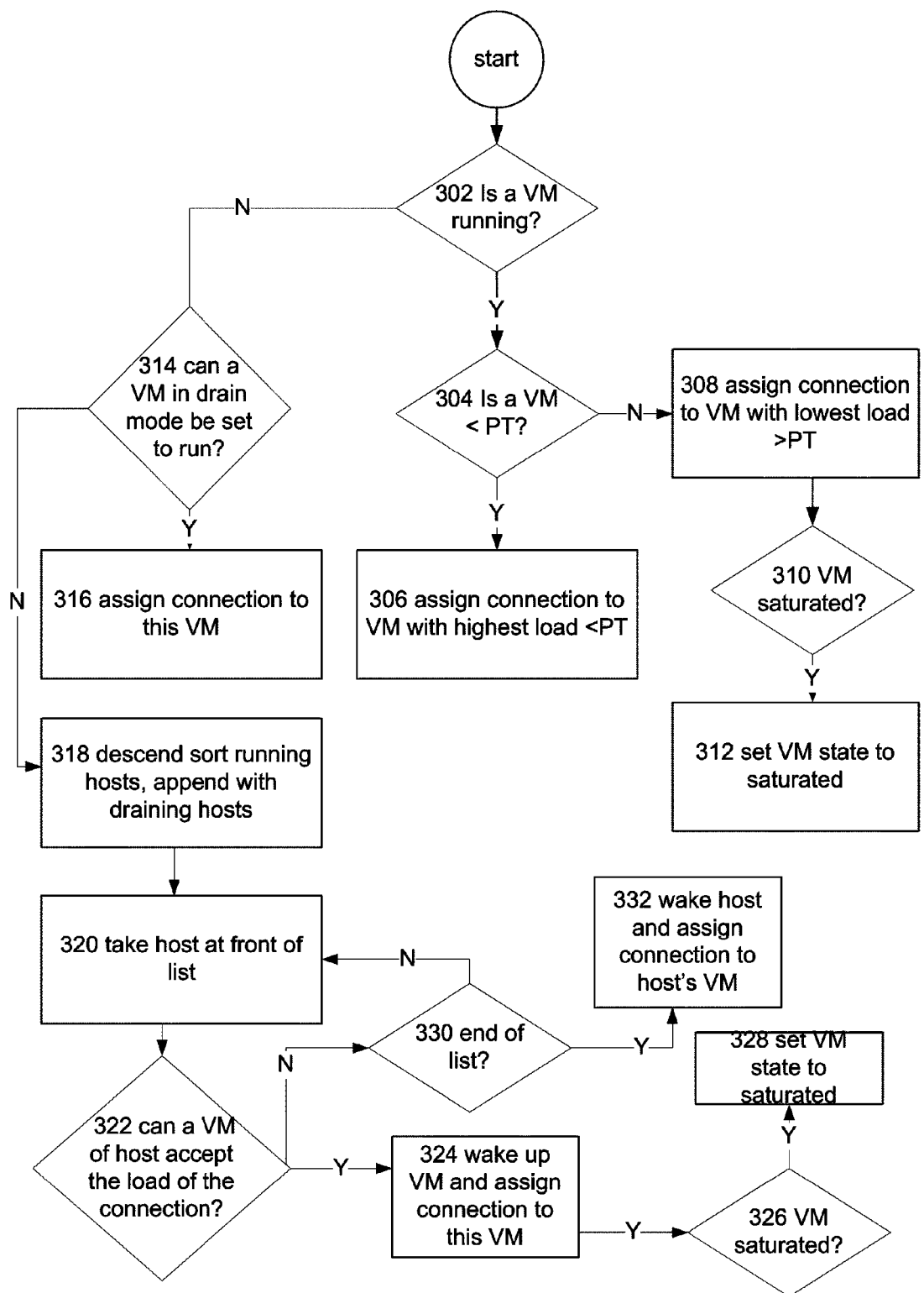
FIG. 3 illustrates an example process flow for assigning an incoming remote presentation session connection to a VM of a server farm.

FIG. 3 illustrates an example process flow for assigning an incoming remote presentation session connection to a VM of a server farm, such as server farm 200 of FIG. 2. This process flow may be performed by connection broker 202 of FIG. 2.

At 302, connection broker, in response to receiving a connection request from a client, such as client 212 of FIG. 2, determines whether a VM of the server farm is running. If a VM is running that is below PT, connection broker assigns the incoming connection to the VM with the highest load that is also below PT 304. This may be accomplished, for instance, by determining the load of every running VM, and sorting them by load, from high to low, then traversing the sorted list until finding the first VM below PT.

Where "list" is used, both here and below, it does not necessarily refer to a list data structure, but rather, a sorting of items in some manner (such as VMs from lowest load to highest load) independent of any underlying data structure(s) used in the sorting.

If there is no VM below PT (which could be determined by traversing the list and not finding a VM below PT), connection broker assigns the connection to the VM with the lowest load above PT 308. Using the above sorted list, this would by the last VM in the list. Connection broker then determines whether this VM is saturated 310, and if it is, changes the VM's state to saturated 312.

If, at 302, connection broker determines that no VM is running, connection broker then determines at 314 whether a VM in drain state can be set to running state. If it can, connection broker assigns this connection to a VM that can be set to running state, choosing the VM that can be set to running state with the highest load among VMs that can be set to running state. If no VM in drain state can be set to running state, connection broker sorts the hosts in running state by load, descending from high to low, and appends this list with hosts in drain sleep state.

Connection broker then traverses this list, by taking the host at the front of the list (the one with the highest load) 320, and determining if any VM of this host can accept the load of the incoming connection 322. If one such VM can, connection broker wakes up the VM and assigns the connection to this VM 324. Then connection broker determines if this new connection saturates the VM 326, and if so, sets the VM's state to saturated 328.

If, at 322, connection broker determines that no VM of this host can accept the load of the incoming connection, it determines if there is another host remaining in the list 330. If there is such a host, it loops back to take the next host at the front of the list 320. If the end of the list has been reached 330, indicating that there is no host that can accept the incoming connection, connection broker wakes a sleeping host, and assigns the incoming connection to a VM of this host 332. This may be achieved, for example, by connection broker sending the sleeping host a wake-on-LAN (local area network) instruction.

Figure 9:
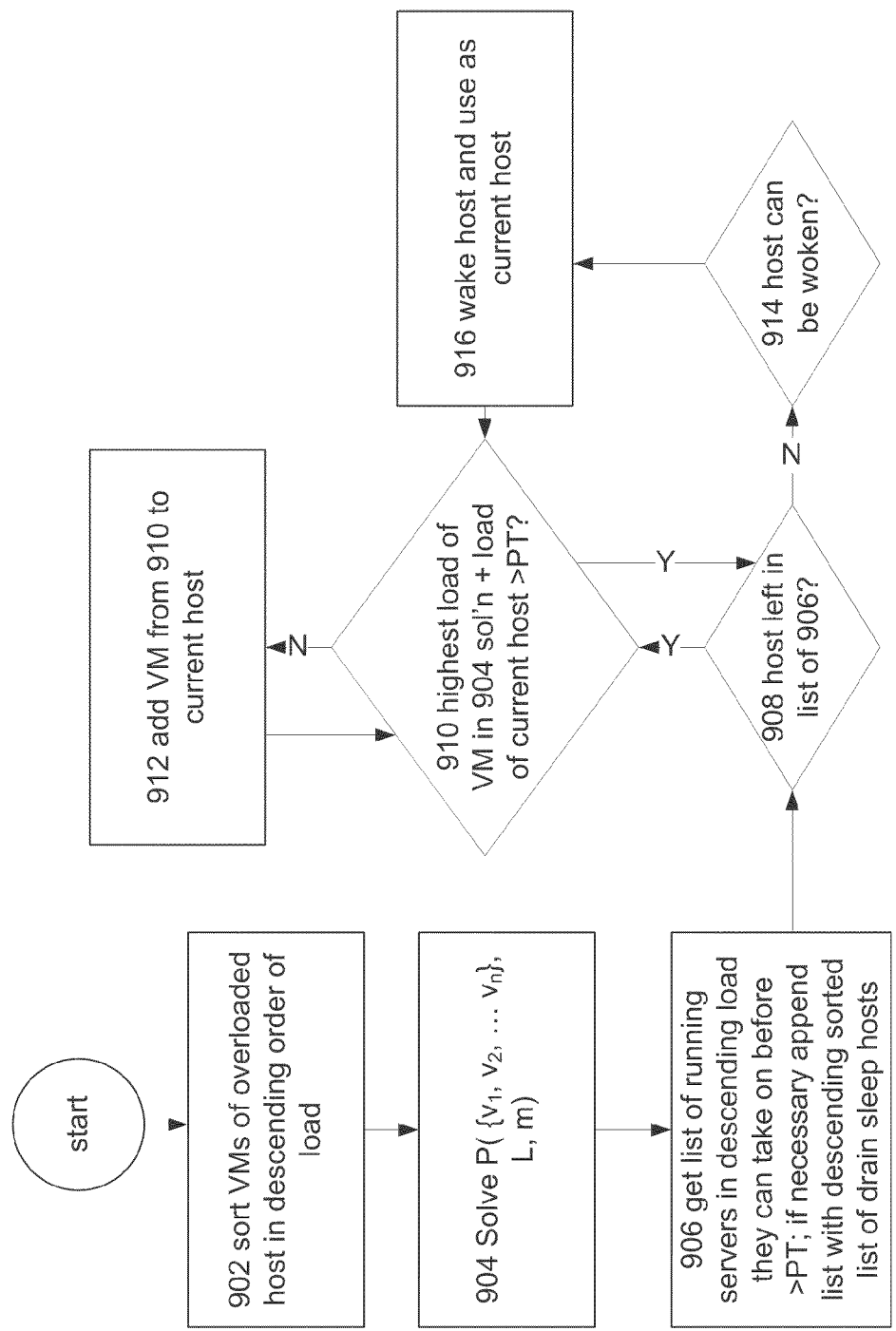
FIG. 9 illustrates an example process flow for migrating running VMs from a host in drain sleep state to a running host or hosts.

In embodiment where connection broker performs the process flow of FIG. 3, as well as the host consolidation process flow of FIG. 9, these process flows may be mutually lock protected, as the two processes may interfere with each other if simultaneously executing. Where the two process flows are implemented as computer-executable instructions, this lock protection may be implemented through use of a semaphore or mutex around each of the two process flows.

Figure 4:
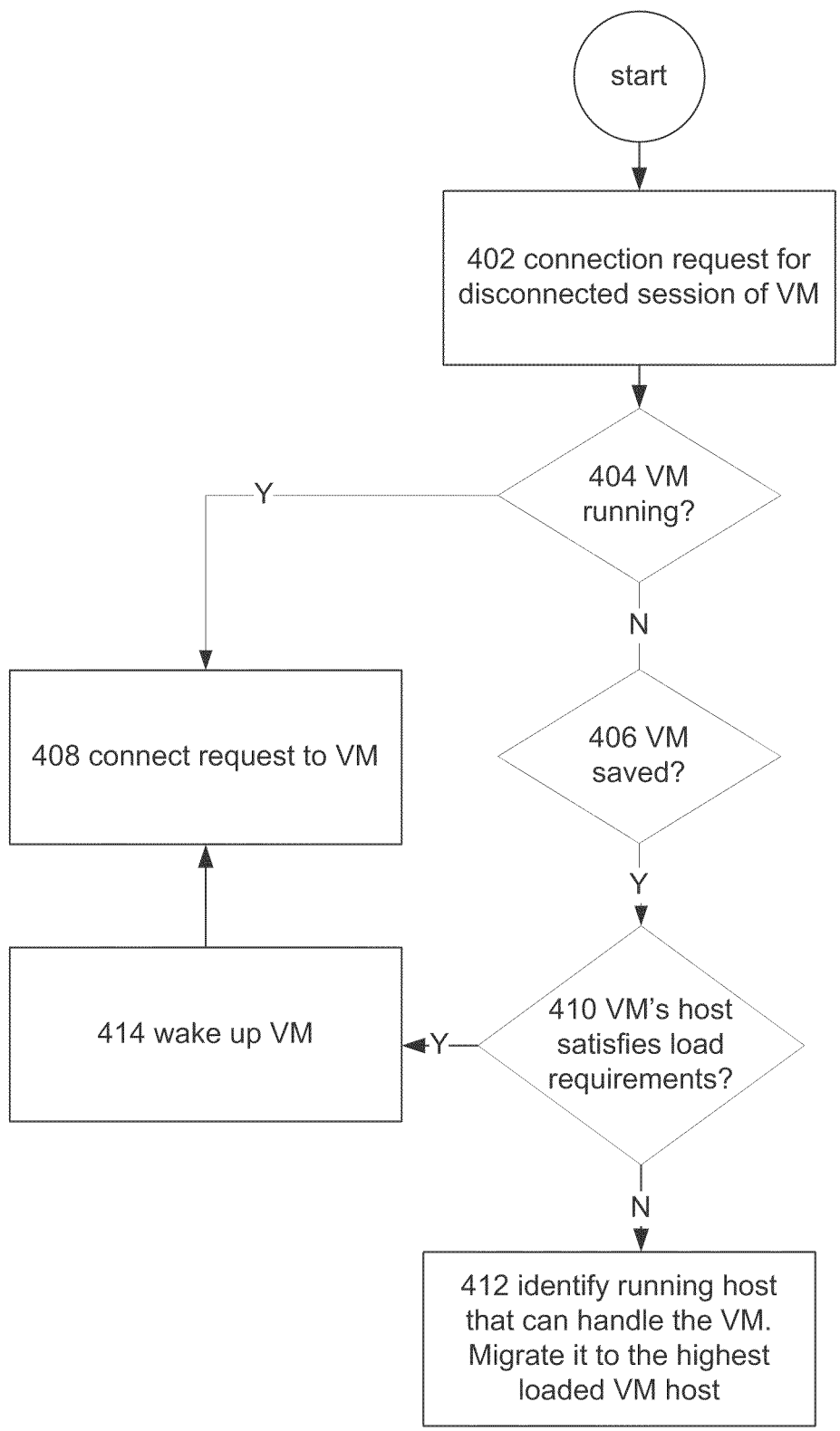
FIG. 4 illustrates an example process flow for assigning an incoming remote presentation session connection to a VM of a server farm, where the remote presentation session corresponds to a disconnected session on the server farm.

FIG. 4 illustrates an example process flow for assigning an incoming remote presentation session connection to a VM of a server farm, such as server farm 200 of FIG. 2, where the remote presentation session corresponds to a disconnected session on the server farm. This process flow may be performed by connection broker 202 of FIG. 2.

At 402, connection broker receives the connection request for the disconnected session. As discussed above, a disconnected session may be distinguished from a logged off session in that a disconnected session may still have activity associated with it, such as a batch process being executed, even though an active remote presentation session is not occurring with a client; further where the client locks the remote presentation session similar to locking a desktop computer, the session is set to disconnected rather than logged off. At 404, connection broker determines whether the VM corresponding to the disconnected session (the VM that previously served this remote presentation session that was disconnected) is currently running. If it is, the connection is assigned to that VM 408. If the VM is not running, at 406 connection broker determines whether the VM is saved—the state of the VM has been saved to memory and the VM is not currently being executed. If it is saved, at 410 connection broker determines whether adding the load of this incoming connection would keep the load of the VM's host below its maximum allowed load. If so, connection broker wakes up the VM 414, and assigns the connection to the VM 408.

If, at 410, connection broker determines that adding the load of this incoming connection would not keep the load of the VM's host below its maximum allowed load, connection broker identifies a host in running state that can accommodate the load of the VM and migrates the VM to this host 412, such as through live migration. Connection broker may migrate the VM to the host with the highest present load. In doing so, the purpose is to accumulate saved VMs on a host with a load below GT so that the host may be run in a lower power mode (for instance, by reducing a clock speed of a processor of the host), and when the VM is woken up, it does not need to be migrated to a new host because this host has too great a load.

Figure 5:
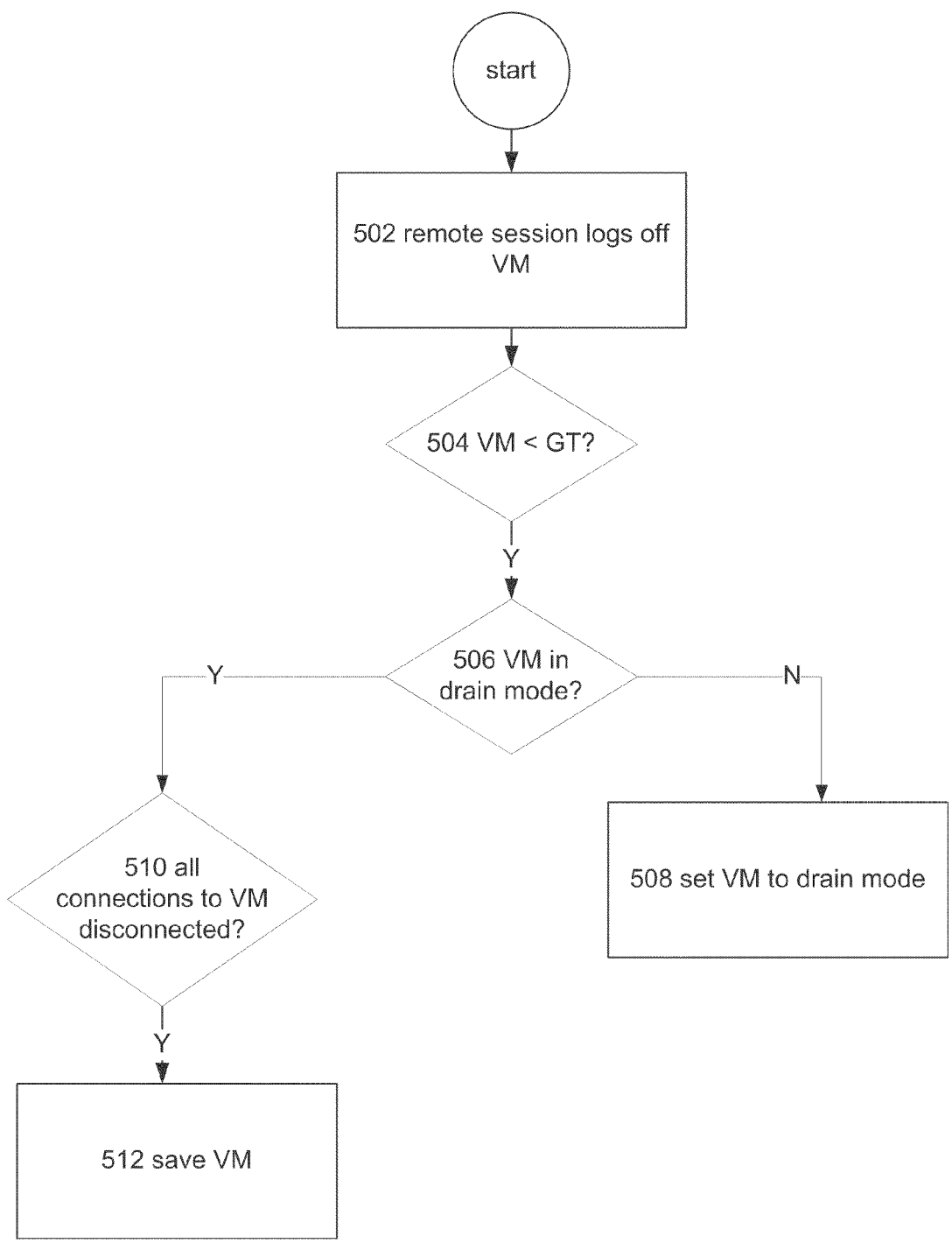
FIG. 5 illustrates an example process flow for managing a host of a server farm when a remote presentation session logs off a VM of the host.

FIG. 5 illustrates an example process flow for managing a host of a server farm, such as server farm 200 of FIG. 2, when a remote presentation session logs off a VM of the host. This process flow may be performed by connection broker 202 of FIG. 2.

At 502, connection broker determines that a client of a remote presentation session hosted by a VM of a host of the server farm has logged off. It may determine this, for instance, by periodically querying the host's VMM for this information. Connection broker determines whether this reduction of load places the VM below GT 504. If it does place the VM below GT, connection broker determines whether the VM is in drain mode 506. If the VM is not in drain mode, connection broker sets the VM to drain mode 508. If the VM is in drain mode, VM determines if all connections to the VM are disconnected 510. If all connections to the VM are disconnected, connection broker saves the VM.

Figure 6:
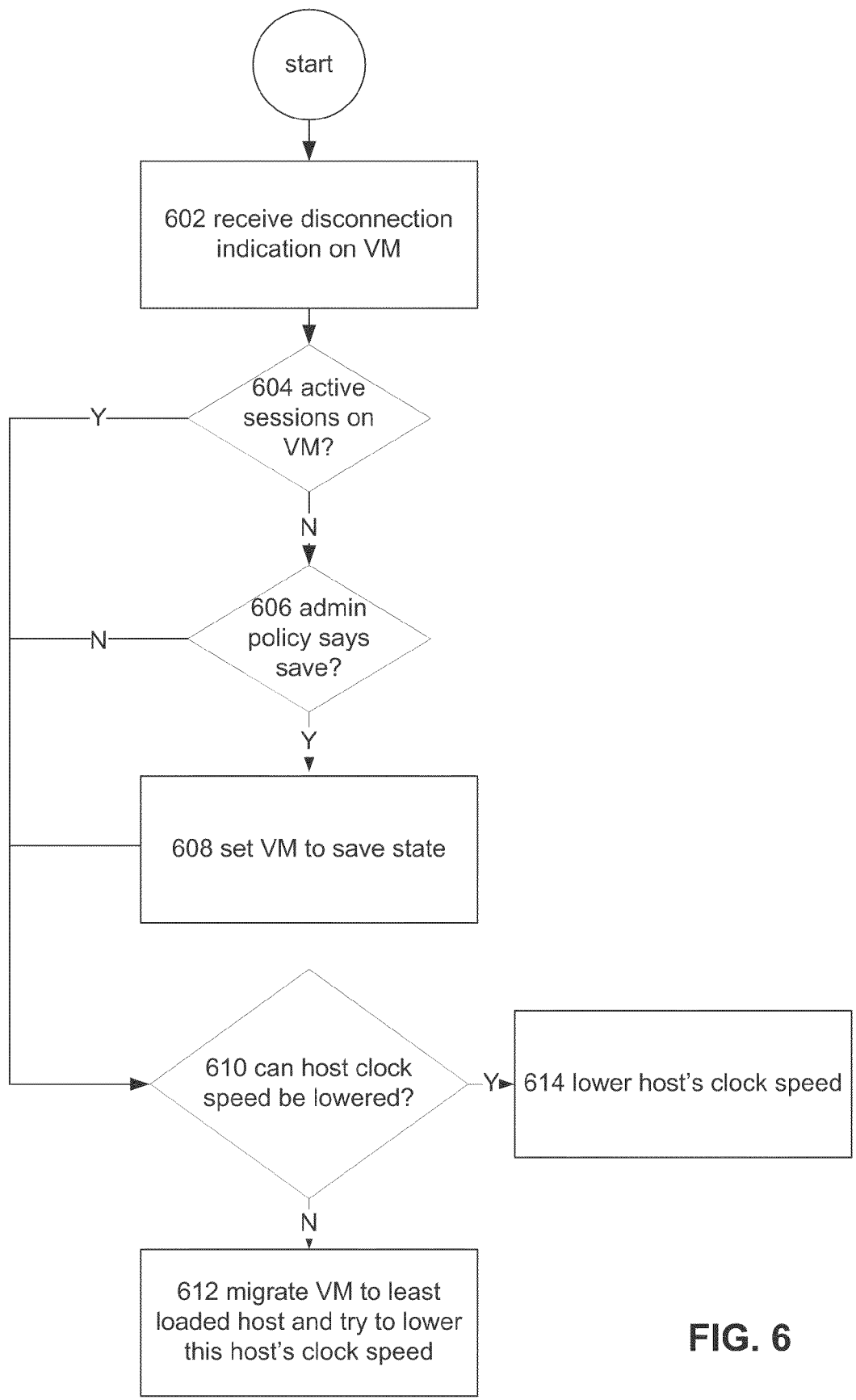
FIG. 6 illustrates an example process flow for managing a host of a server farm when a remote presentation session disconnects from a VM of the host.

FIG. 6 illustrates an example process flow for managing a host of a server farm, such as server farm 200 of FIG. 2, when a remote presentation session disconnects from a VM of the host. This process flow may be performed by connection broker 202 of FIG. 2.

At 602, connection broker determines that a client of a remote presentation session hosted by a VM of a host of the server farm has disconnected. It may determine this, for instance, by periodically querying the host's VMM for this information. Connection broker then determines whether any active sessions remain on the VM 604. If no active session remains, connection broker may consult an administrative policy as to whether to save the VM 606. For instance, the administration policy may state that where no active sessions remain, the VM is to be put to sleep. A disconnected session may still be responsible for activity, such as if a batch process associated with the disconnected session is still executing, so an administration policy may state that the VM is to be put to sleep only if there is no active session, and no disconnected session has current or pending activity. If the administration policy does say to save the VM, the VM is saved 608.

After the VM is saved, as well as where it is determined that there are active sessions on the VM 604, and an administration policy says not to save the VM 606, at 610, connection broker determines whether the host of the VM can have a clock speed of its processor lowered. Some processors may operate at a plurality of clock speeds (e.g. 300 MHz, 600 MHz, or 1.2 GHz), and the clock speed may be set by sending the computer an instruction that sets the current clock speed. A lower clock speed will typically cause a processor to expend less electricity than a higher clock speed.

If the host's clock speed can be lowered (such as if a processor of the host is configured to run at multiple clock speeds, or if lowering the clock speed will not saturate the host), connection broker indicates to the host to lower its clock speed 614.

If, at 610, connection broker determines that the host's clock speed cannot be lowered, it migrates the VM to the least loaded host of the server farm and attempts to lower the clock speed of this host 612. It may accomplish this, for example, by sorting all running hosts in an ascending list (lowest load first), and migrating the VM to the least-loaded host, which would be the first host in the list using this technique.

Figure 7:
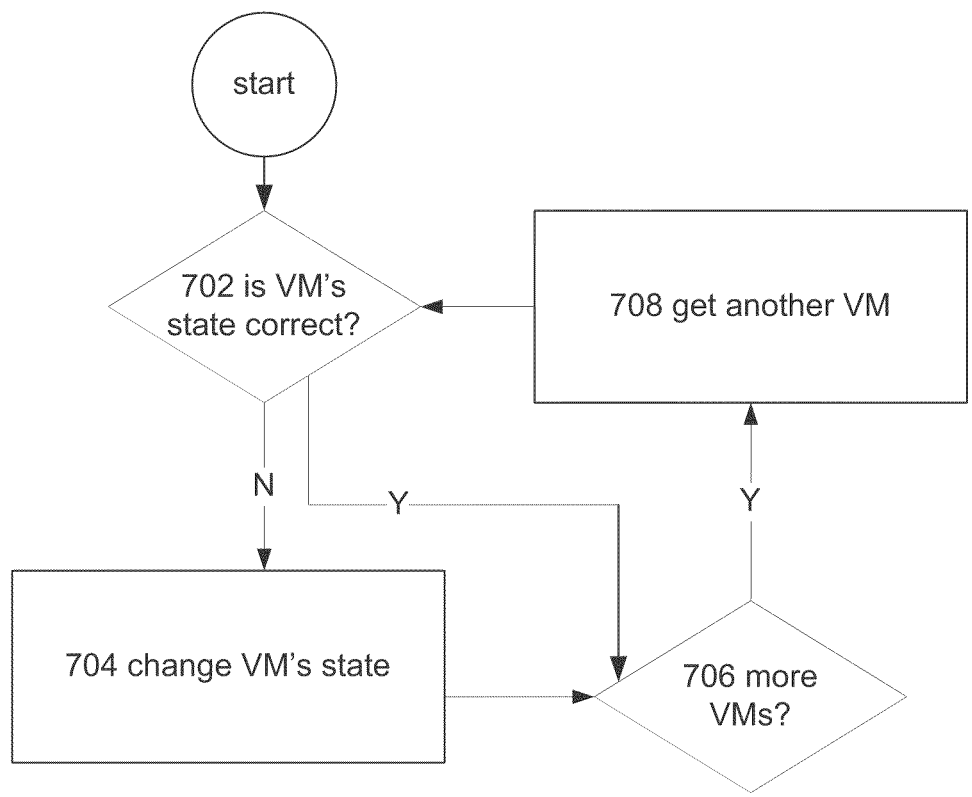
FIG. 7 illustrates an example process flow for managing a host of a server farm when its state may change over time.

FIG. 7 illustrates an example process flow for managing a host of a server farm, such as server farm 200 of FIG. 2, when its state may change over time. This process flow may be performed by connection broker 202 of FIG. 2.

At 702, connection broker checks the load of a VM and determines whether its present state is correct. For instance, a VM may have been properly set to running state, but a remote presentation session of the VM then caused the VM to use as many processing resources as it had available (such as be executing a very CPU-intensive task, like 3D-modeling). So, while the VM's state is running, its load now exceeds PT and corresponds to a saturated state. If the VM's state should be changed, at 704 connection broker changes the VM's state to its correct state. Whether the VM's load is correct 702, or was incorrect and has been changed 705, connection broker determines if another VM remains to be checked 706. If a VM remains to be checked, connection broker gets another VM 708, and then performs the determination of 702 with the VM gotten in 708.

(B) Periodic Analysis of Hosts

FIGS. 8-11 illustrate example process flows for periodically analyzing and managing hosts independent of an incoming connection occurring.

These techniques are directed to fitting VMs into the minimum required number of currently running hosts, and freeing lightly loaded hosts for tasks such as maintenance by distributing their load onto leanly loaded hosts. These techniques may be performed on a periodic basis.

The period in which each technique may be executed may vary. For instance, migration of a VM between hosts takes a great deal of resources, and it may be desirable to avoid doing this frequently. To that end, where other techniques are executed more frequently, techniques that may result in VM consolidation may have a period that is several times the time required for consolidation and migration of a VM.

Figure 8:
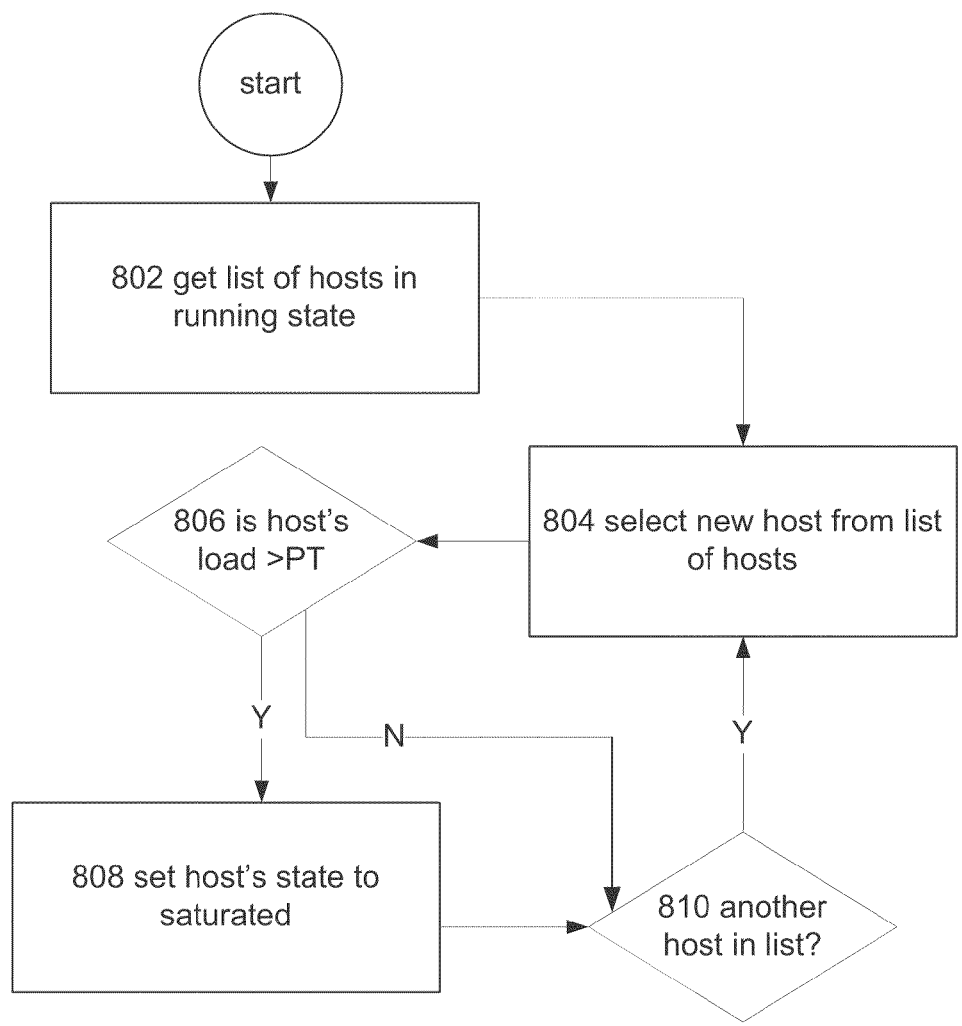
FIG. 8 illustrates an example process flow for managing saturated hosts of a server farm when its state may change over time.

FIG. 8 illustrates an example process flow for managing saturated hosts of a server farm, such as server farm 200 of FIG. 2, when its state may change over time. This process flow may be performed by connection broker 202 of FIG. 2.

At 802, connection broker determines a list of hosts in a running state. Where no hosts are running, the process flow ends. At 804, connection broker selects a host from the list of hosts—such as the first host of the list. If this selected host has a load in excess of PT 806, connection broker changes the state of this selected host to saturated 808. In an embodiment, a saturated host Is not allowed by connection broker to host an additional VM. If this selected host does not have a load in excess of PT 806, or if connection broker has changed the state of this selected host to saturated 808, at 810, connection broker determines if a host remains in the list of hosts. If a host does remain, connection broker selects a new host at 804 to perform the process flow on.

FIG. 9 illustrates an example process flow for migrating running VMs from a host in drain sleep state to a running host or hosts of a server farm, such as server farm 200 of FIG. 2. This process flow may be performed by connection broker 202 of FIG. 2. An overloaded host may have its performance severely impacted, so it may be preferable to perform this process flow with a relatively small time period.

The problem may be reduced into packing "m" objects (the VMs with their resource requirements) of variable size into "n" containers of variable sizes (the hosts with variable available load)—sometimes referred to as the "knapsack packing problem." This is a problem known to be NP hard—there are no known techniques for solving the problem in polynomial time. Given that the parameters of the problem are continually changing (the number of remote presentation sessions and their load), finding the optimal solution is disfavored due to the time required to find it—by the time its found, the parameters of the problem have likely changed, and it needs to be solved again. Instead, a greedy heuristic may be used—one that takes the locally optimal choice at any single point in the process flow.

Where connection broker identifies an overloaded host (one whose load is above MT), it sorts the VMs of this overloaded host in descending order by load (the VM with the highest load comes first) 902. Then, at 904 connection broker solves a dynamic programming problem for the VMs of the host to determine the smallest number of VMs with a total load, which if removed from the host, would bring the host's load below MT. This may be expressed as $P(\{v_1, v_2, \ldots v_n\}, L, m) = \text{Best of }_{i=1 \text{ to } n}[P(\{v_{i+1}, v_{i+2}, \ldots v_n\}, L-v_i, m)] + \{v_i\}$, where Best of [ ] takes the solution with the lowest sum>=L (load on the host). In this, there are n VMs executing on the host, $v_1, v_2, \ldots v_n$. In an embodiment, a min-heap (a heap data structure where the smallest element is always the root node, so determining the smallest element requires only determining the value of the root) is maintained, and as Best of [ ] produces solutions, those solutions are pushed onto the heap. Where there are multiple solutions than the chosen solution is the one with the smallest standard deviation among the solution space.

At 906, connection broker obtains a list of running hosts in descending order of the load that they can take on before reaching PT. If there is no running host with a load below PT, or if in performing the remaining process flow, not every VM may be migrated to those running hosts with a load below PT, this list may be appended with a descending list of drain sleep hosts based on load they can take on before hitting PT. At 908, if there is a host remaining in the list obtained at 906, connection broker takes the VM with the greatest load of the VMs of the smallest number of VMs with a load, which if removed from the host, would bring the host's load below MT as determined in 904, and determines whether adding this VM to the currently selected host would cause this host's load to exceed PT 910. If it would not, the VM is added to this host at 912, and process 910 is repeated with the VM with the next highest load. If it would cause the host's load to exceed PT 910, connection broker returns to 908 to determine if there is another host left in the list of 906. If there is, the process returns to 910. If there is not, connection broker determines if a host can be woken from a hibernation state, such as through a wake-on-LAN operation 914. If a host can be woken, it is woken 916, and for this newly woken host, the determination of 910 is made. If at 914, connection broker determines that another host cannot be woken, the process ends.

In an embodiment where not all VMs can be migrated, connection broker logs an indication of this with a timestamp.

There exist other techniques that may be implemented in the place of the example process flow of FIG. 9 to deal with overloaded hosts.

In an embodiment, a greedy heuristic is implemented, where a sliding window of size m is used to traverse a list of VMs in descending order by load until an optimal solution is found (one with the smallest standard deviation of loads among VMs in the solution). Doing so ensures that the solution space has a low standard deviation between loads of selected VMs, which means that the risk of taking a VM with high load for migration is reduced (it is a risk since it may be difficult to find a host that has enough available load to execute the VM without becoming overloaded itself.

In another embodiment, a different greedy heuristic is implemented. This embodiment identifies the smallest set of VM loads on an overloaded host for migration, that when migrated will bring the overloaded host's load below MT. First the VMs are sorted based on descending load. In the embodiment, the first VM from the list is taken until migrating all the taken VMs will bring the host's load below MT. In a similar embodiment, the last VM selected is the VM with the smallest load, that if migrated with the other selected VMs, would bring the host's load below MT.

Figure 10:
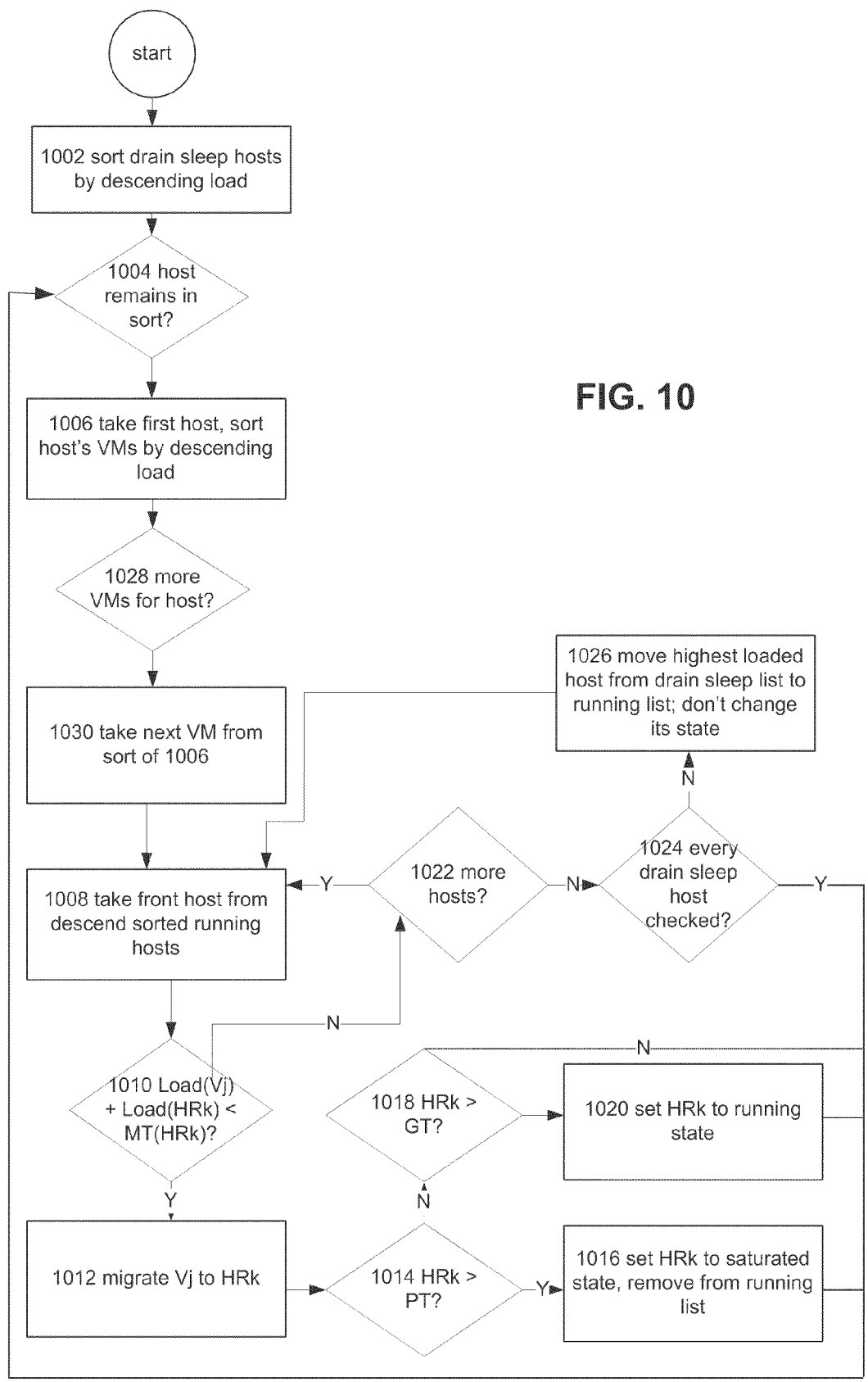
FIG. 10 illustrates an example process flow for migrating running VMs from a host in drain sleep state (sometimes referred to as under-loaded hosts) to a running host or hosts.

FIG. 10 illustrates an example process flow for migrating running VMs from a host in drain sleep state (sometimes referred to as under-loaded hosts) to a running host or hosts of a server farm, such as server farm 200 of FIG. 2. This process flow may be performed by connection broker 202 of FIG. 2.

First connection broker sorts all hosts in drain sleep state by ascending load (putting the host with the lowest load first) 1002. At 1004, connection broker determines that there is a host in the sort (at this point, this determination is whether any host is in drain sleep state). Where there is such a host, connection broker takes the first host from the list ($HS_i$—the one remaining in the list with the lowest load) and sorts its VMs in descending order by load (putting the VM with the highest load first) 1006. Connection broker takes the first VM from this sort ($VM_j$ which is running on $HS_i$—the VM remaining in the sort with the highest load) 1030.

Connection broker then takes the first host of a list of running hosts sorted in descending order by load ($HR_k$—the running host remaining in the list with the highest load) 1008. If $\text{Load}(VM_j) + \text{Load}(HR_k) < \text{MT}(HR_k)$ (determined at 1010) then $VM_j$ is migrated to $HR_k$ at 1012. If migrating $VM_j$ to $HR_k$ causes $\text{Load}(HR_k) > \text{PT}$ as determined at 1014, then connection broker sets the state of $HR_k$ to saturated (and thus removes it from the list of running hosts) 1016. If the determination at 1014 is no, then connection broker determines whether migrating $VM_j$ to $HR_k$ causes $\text{Load}(HR_k) > \text{GT}$ at 1018. If this is true, then connection broker sets the state of $HR_k$ to running at 1020. Where process element 1016 or 1020 is executed, or the result of 1018 is no (or, as discussed later, the result of 1024 is yes), connection broker determines if $HS_i$ has another VM to be checked at 1028. If it does, then the process flow returns to 1030, where the next VM is selected.

If at 1010, connection broker determines that Load(VM$_j$)+Load(HR$_k$)!<MT(HR$_k$) (is not less than), then connection broker looks for another host on which to migrate VM$_j$. If connection broker determines that there is another host in the list of running hosts at 1022, the process returns to 1008 to attempt to migrate VM$_j$ to this new running host. If there is not another host in the list of running hosts 1022, connection broker determines if every host in drain sleep state has been checked for placement of VM$_j$ 1024. If not every drain sleep host has been checked 1024, the host in list of unchecked drain sleep hosts with the highest load is moved to the list of running hosts (its state is not changed to running, however) 1026 and the process returns to 1008 to attempt to migrate VM$_j$ to this new drain sleep host.

If, at 1024, it is determined that every drain sleep host has been checked, then VM$_j$ is not migrated, and connection broker determines if there are any more VMs on HS$_i$ to attempt to migrate to their host. Where it is determined at 1028 that there are no more VMs on HS, to attempt to migrated to another host (because every VM was either migrated or could not be migrated), the process returns to 1004 to determine whether there exists a drain sleep host for which connection broker has not yet attempted to migrate away its VMs. Where connection broker determines at 1004 that it has already attempted to migrate away the VMs of each drain sleep host in this iteration of the process, this iteration of the process flow concludes.

Figure 11:
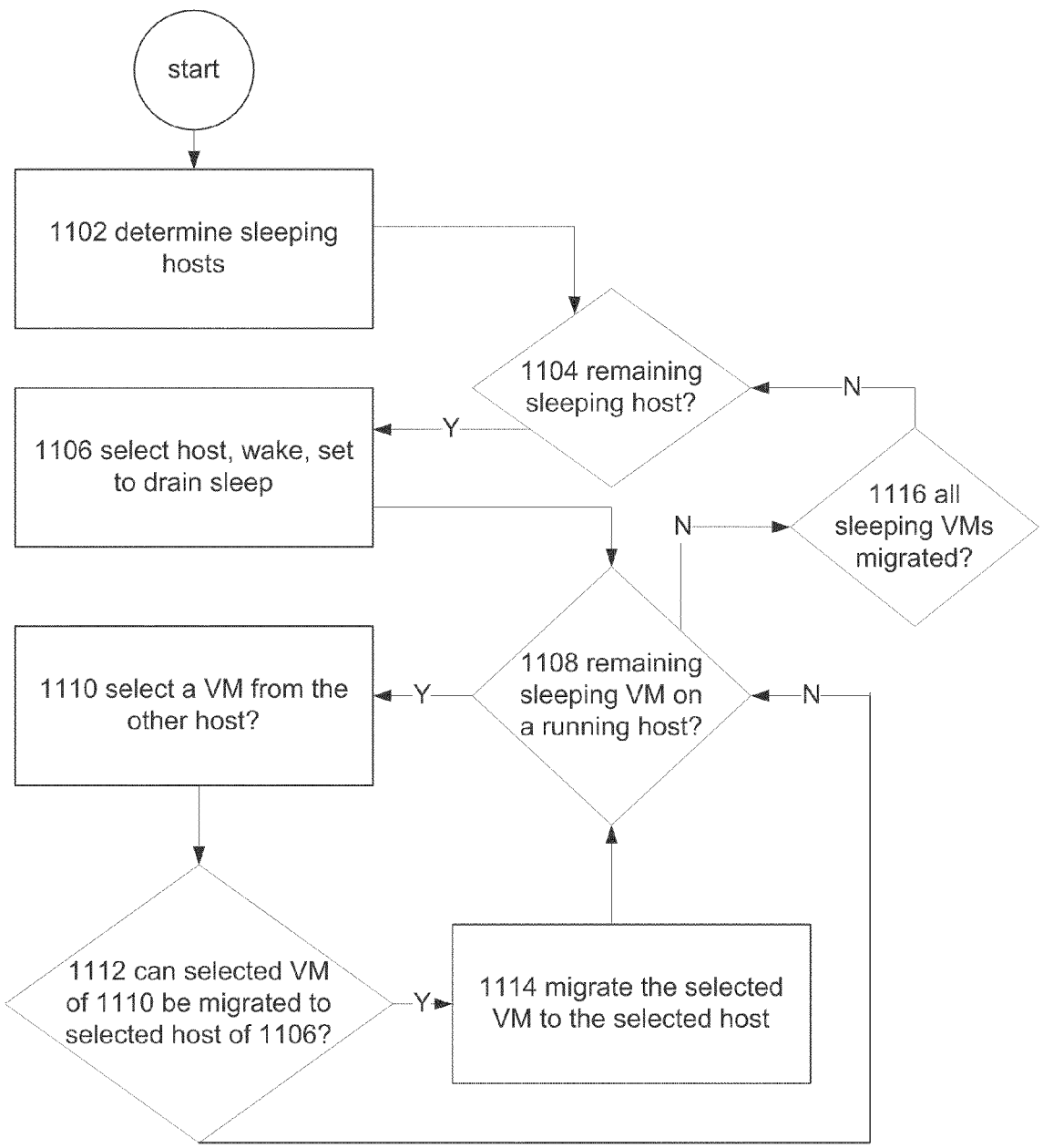
FIG. 11 illustrates an example process flow for migrating saved VMs to a host in drain sleep state.

FIG. 11 illustrates an example process flow for migrating saved VMs to a host in drain sleep state of a server farm, such as server farm 200 of FIG. 2. This process flow may be performed by connection broker 202 of FIG. 2.

At 1102, connection broker determines which hosts are sleeping. If there is a sleeping host 1104, connection broker selects a sleeping host, wakes it, and sets its state to drain sleep 1106. Connection broker then determines whether there is a sleeping VM on a running host 1108. If there is, connection broker 1110 selects one such sleeping VM 1110, and determines whether that sleeping VM can be moved to the host woken (in 1106) 1112. If the sleeping VM can be moved to this host, it is moved to this host 1114. After it has been moved, or if it cannot be moved, connection broker returns to 1108 to determine whether another sleeping VM exists on a running host.

Where, at 1108, connection broker determines that there are no more sleeping VMs on a running host (one that has not been checked to see if it can be moved to the host under consideration in 1112), connection broker then determines if all sleeping VMs on running hosts have been moved 1116. If there remain sleeping VMs that have not been moved from running hosts, connection broker determines if there exists another sleeping host 1104. Where there is another sleeping host, connection broker selects the host, wakes it, and sets its state to drain sleep 1106, and repeats the process flow starting at 1106 for this host.

Conclusion

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for managing a plurality of hosts, the plurality of hosts configured to execute a plurality of virtual machines (VMs), a VM being configured to serve a remote presentation session, comprising:

receiving a request to connect a client to a remote presentation session;

making a first determination that no VM of the plurality of VMs is both set to accept remote presentation session connections and has a load less than a first threshold indicative of a level of computer resource usage above which remote presentation sessions should not be added;

identifying, in response to the first determination, a subset of the plurality of VMs, each VM of the subset being set to a drain state indicative of allowing the VM of the subset to enter a sleep state;

identifying a first VM in the subset having a highest load of VMs in the subset;

setting the first VM to accept remote presentation session connections;

sending the first VM an indication to conduct the remote presentation session with the client;

receiving a request to connect a second remote presentation session; and sending a second VM an indication to conduct the second remote presentation session upon determining that no VM of the plurality of VMs has a load below the first threshold and determining that a second VM of the plurality of VMs has a lowest load above the first threshold.

2. The method of claim 1, further comprising:

receiving a request to connect to a second remote presentation session;

determining that a host of the plurality of hosts has a highest load below a second threshold below the first threshold, the host configured to execute a second VM of the plurality of VMs; and sending the second VM an indication to conduct the second remote presentation session.

3. The method of claim 1, further comprising:

receiving a request to connect a second remote presentation session;

determining that no VM of the subset of VMs of the plurality of VMs that are set to refuse connections may be set to accept connections;

determining that a second VM of the plurality of VMs can accept a load of the second remote presentation session, the second VM being in a sleeping state;

waking the second VM; and sending the second VM an indication to conduct the second remote presentation session.

4. The method of claim 1, further comprising:

receiving a request to connect a second remote presentation session;

determining that the request to connect a second remote presentation session corresponds to a disconnected remote presentation session conducted by a second VM of the plurality of VMs;
determining that the second VM is running; and
sending the second VM an indication to conduct the second remote presentation session.

5. The method of claim 1, further comprising:
receiving a request to connect a second remote presentation session;
determining that the request to connect to a second remote presentation session corresponds to a disconnected remote presentation session conducted by a second VM of the plurality of VMs;
determining that the second VM is in a saved state;
determining that a physical host of the second VM has available load to execute the second VM;
waking the second VM; and
sending the second VM an indication to conduct the second remote presentation session.

6. The method of claim 1, further comprising:
receiving a request to connect a second remote presentation session;
determining that the request to connect to a second remote presentation session corresponds to a disconnected remote presentation session conducted by a second VM of the plurality of VMs;
determining that the second VM is in a saved state;
determining that a physical host of the second VM lacks available load to execute the second VM;
identifying a third VM of the plurality of VMs, the identifying based at least in part on the third VM operating on a host having a highest load among hosts in the plurality of hosts that have a load below a second threshold, the second threshold below the first threshold and indicative of running the third VM in a low power state; and
sending the third VM an indication to conduct the second remote presentation session.

7. The method of claim 1, further comprising:
determining that a state of a second VM of the plurality of VMs is incorrect based on a load of the second VM; and
changing the state of the second VM.

8. The method of claim 7, further comprising:
receiving an indication of the load of the second VM from a virtual machine monitor (VMM) that manages the execution of the second VM.

9. The method of claim 8, wherein the VMM monitors the load of the second VM based on a system call made from the second VM to a host on which the second VM and the VMM execute.

10. The method of claim 8, wherein the VMM monitors the load of the second VM by querying the second VM for the load.

11. A system for managing a plurality of hosts, the plurality of hosts configured to execute a plurality of virtual machines (VMs), a VM being configured to serve a remote presentation session, comprising:
a processor; and
a memory bearing processor executable instructions that, upon execution by the processor, cause the system at least to:
receive a request to connect a client to a remote presentation session;
make a first determination that no VM of the plurality of VMs is both set to accept remote presentation session connections and has a load less than a first threshold indicative of a level of computer resource usage above which remote presentation sessions should not be added;
identify, in response to the first determination, a subset of the plurality of VMs, each VM of the subset being set to a drain state indicative of allowing the VM of the subset to enter a sleep state;
identify a first VM in the subset having a highest load of VMs in the subset;
set the first VM to accept remote presentation session connections;
send the first VM an indication to conduct the remote presentation session with the client;
receive a request to connect a second remote presentation session; and
send a second VM an indication to conduct the second remote presentation session upon determining that no VM of the plurality of VMs has a load below the first threshold and determining that a second VM of the plurality of VMs has a lowest load above the first threshold.

12. The system of claim 11, wherein the memory further bears instructions that, upon execution by the processor, cause the system at least to:
receive a request to connect to a second remote presentation session;
determine that a host of the plurality of hosts has a highest load below a second threshold below the first threshold, the host configured to execute a second VM of the plurality of VMs; and
send the second VM an indication to conduct the second remote presentation session.

13. The system of claim 11, wherein the memory further bears instructions that, upon execution by the processor, cause the system at least to:
receive a request to connect a second remote presentation session;
determine that no VM of the subset of VMs of the plurality of VMs that are set to refuse connections may be set to accept connections;
determine that a second VM of the plurality of VMs can accept a load of the second remote presentation session, the second VM being in a sleeping state;
wake the second VM; and
send the second VM an indication to conduct the second remote presentation session.

14. The system of claim 11, wherein the memory further bears instructions that, upon execution by the processor, cause the system at least to:
receive a request to connect a second remote presentation session;
determine that the request to connect a second remote presentation session corresponds to a disconnected remote presentation session conducted by a second VM of the plurality of VMs;
determine that the second VM is running; and
send the second VM an indication to conduct the second remote presentation session.

15. The system of claim 11, wherein the memory further bears instructions that, upon execution by the processor, cause the system at least to:
receive a request to connect a second remote presentation session;
determine that the request to connect to a second remote presentation session corresponds to a disconnected remote presentation session conducted by a second VM of the plurality of VMs;

determine that the second VM is in a saved state;
determine that a physical host of the second VM has available load to execute the second VM;
wake the second VM; and
send the second VM an indication to conduct the second remote presentation session.

16. The system of claim 11, wherein the memory further bears instructions that, upon execution by the processor, cause the system at least to:
receive a request to connect a second remote presentation session;
determine that the request to connect to a second remote presentation session corresponds to a disconnected remote presentation session conducted by a second VM of the plurality of VMs;
determine that the second VM is in a saved state;
determine that a physical host of the second VM lacks available load to execute the second VM;
identify a third VM of the plurality of VMs, the identifying based at least in part on the third VM operating on a host having a highest load among hosts in the plurality of hosts that have a load below a second threshold, the second threshold below the first threshold and indicative of running the third VM in a low power state; and
send the third VM an indication to conduct the second remote presentation session.

17. The system of claim 11, wherein the memory further bears instructions that, upon execution by the processor, cause the system at least to:
determine that a state of a second VM of the plurality of VMs is incorrect based on a load of the second VM; and
change the state of the second VM.

18. The system of claim 17, wherein the memory further bears instructions that, upon execution by the processor, cause the system at least to:
receive an indication of the load of the second VM from a virtual machine monitor (VMM) that manages the execution of the second VM.

19. The system of claim 18, wherein the VMM monitors the load of the second VM based on a system call made from the second VM to a host on which the second VM and the VMM execute.

20. A computer-readable storage medium, excluding propagation media, bearing computer-executable instructions that, upon execution by a computer, cause the computer to perform operations comprising:
receiving a request to connect a client to a remote presentation session;
making a first determination that no VM of the plurality of VMs is both set to accept remote presentation session connections and has a load less than a first threshold indicative of a level of computer resource usage above which remote presentation sessions should not be added;
identifying, in response to the first determination, a subset of the plurality of VMs, each VM of the subset being set to a drain state indicative of allowing the VM of the subset to enter a sleep state;
identifying a first VM in the subset having a highest load of VMs in the subset;
setting the first VM to accept remote presentation session connections;
sending the first VM an indication to conduct the remote presentation session with the client;
receiving a request to connect a second remote presentation session; and
sending a second VM an indication to conduct the second remote presentation session upon determining that no VM of the plurality of VMs has a load below the first threshold and determining that a second VM of the plurality of VMs has a lowest load above the first threshold.

* * * * *